United States Patent

Wool

Patent Number: 6,073,122
Date of Patent: Jun. 6, 2000

[54] CRYPTOGRAPHIC METHOD AND APPARATUS FOR RESTRICTING ACCESS TO TRANSMITTED PROGRAMMING CONTENT USING EXTENDED HEADERS

[75] Inventor: Avishai Wool, Livingston Township, Essex County, N.J.

[73] Assignee: Lucent Technologies Inc., Murray Hill, N.J.

[21] Appl. No.: 08/911,650

[22] Filed: Aug. 15, 1997

[51] Int. Cl.⁷ .................................................. G06F 17/60
[52] U.S. Cl. .............................. 705/51; 705/57; 705/58; 380/201; 380/202; 380/278
[58] Field of Search .................................... 705/1, 50–59; 380/35, 36–39, 4, 200–203

[56] References Cited

U.S. PATENT DOCUMENTS

| | | | |
|---|---|---|---|
| 4,388,643 | 6/1983 | Aminetzah | 358/123 |
| 4,866,770 | 9/1989 | Seth-Smith et al. | 380/20 |
| 5,263,159 | 11/1993 | Mitsui | 395/600 |
| 5,481,609 | 1/1996 | Cohen et al. | 380/16 |
| 5,502,767 | 3/1996 | Sasuta et al. | 380/48 |
| 5,615,265 | 3/1997 | Coutrot | 380/20 |
| 5,619,274 | 4/1997 | Roop et al. | 348/461 |
| 5,671,276 | 9/1997 | Eyer et al. | 380/4 |
| 5,708,709 | 1/1998 | Rose | 380/4 |
| 5,757,907 | 5/1998 | Cooper et al. | 380/4 |
| 5,805,204 | 9/1998 | Thompson et al. | 348/13 |

FOREIGN PATENT DOCUMENTS

| | | |
|---|---|---|
| 0 343 805 | 11/1989 | European Pat. Off. |
| 0 450 841 | 10/1991 | European Pat. Off. |
| 0 755 154 | 1/1997 | European Pat. Off. |
| 0 822 719 | 2/1998 | European Pat. Off. |
| WO 95/23468 | 8/1995 | WIPO |
| WO 97/24832 | 7/1997 | WIPO |

OTHER PUBLICATIONS

J. McCormac, European Scrambling Systems, Circuits Tactics and Techniques ("The Black Book"), Waterford University Press, pp. 2–79, 4–10 and 4–11 (1996).

Guillou et al., "Encipherment and Conditional Access" SMPTE Journal, US, SMPTE Inc. Scarsdale, NY, vol. 103, No. 6, pp. 398–406.

*Primary Examiner*—James P. Trammell
*Assistant Examiner*—Yehdega Retta

[57] ABSTRACT

A system for restricting access to transmitted programming content is disclosed, which transmits the encryption key used to encrypt the program to the customer with the encrypted programming content. A set-top terminal or similar mechanism restricts access to the transmitted multimedia information using stored decryption keys. The set-top terminal preferably receives one or more package keys, $S_J$, periodically from the service provider, each corresponding to a package of programs that the customer is entitled to for a given period. Each program is preferably encrypted by the head-end server prior to transmission using a program key, $K_P$, which may be unique to the program. Header information is transmitted with the encrypted program to the customers, containing a package pair for each package to which the program belongs. A package pair preferably includes an identifier of the package, as well as the program key, $K_P$, encrypted by the corresponding package key, $S_J$. The broadcast of a given program, p, preferably consists of a header portion containing a package pair for each package that the program belongs to, and a program portion containing the program encrypted with the program key, $K_P$. If a customer is entitled to a particular program, the set-top terminal will be able to decrypt the encrypted program key, $K_P$, using an appropriate stored package key, $S_J$, and thereafter use the program key, $K_P$, to decrypt the encrypted program. The header information can be interleaved with the program portion or transmitted on a separate dedicated control channel.

28 Claims, 9 Drawing Sheets

CRYPTOGRAPHIC METHOD AND APPARATUS FOR RESTRICTING ACCESS TO TRANSMITTED PROGRAMMING CONTENT USING EXTENDED HEADERS

FIELD OF THE INVENTION

The present invention relates generally to a system for restricting access to transmitted programming content, and more particularly, to a system for transmitting an encrypted program together with the encryption key used to encrypt the program.

BACKGROUND OF THE INVENTION

As the number of channels available to television viewers has increased, along with the diversity of the programming content available on such channels, it has become increasingly challenging for service providers, such as cable television operators and digital satellite service operators, to offer packages of channels and programs that satisfy the majority of the television viewing population. The development of packages that may be offered to customers is generally a marketing function. Generally, a service provider desires to offer packages of various sizes, from a single program to all the programs, and various combinations in between.

The service provider typically broadcasts the television programs from a transmitter, often referred to as the "head-end," to a large population of customers. Each customer is typically entitled only to a subset of the received programming, associated with purchased packages. In a wireless broadcast environment, for example, the transmitted programming can be received by anyone with an appropriate receiver, such as an antenna or a satellite dish. Thus, in order to restrict access to a transmitted program to authorized customers who have purchased the required package, the service provider typically encrypts the transmitted programs and provides the customer with a set-top terminal (STT) containing one or more decryption keys which may be utilized to decrypt programs that a customer is entitled to. In this manner, the set-top terminal receives encrypted transmissions and decrypts the programs that the customer is entitled to, but nothing else.

In order to minimize piracy of the highly sensitive information stored in the set-top terminals, including the stored decryption keys, the set-top terminals typically contain a secure processor and secure memory, typically having a capacity on the order of a few kilobits, to store the decryption keys. The secure memory is generally non-volatile, and tamper-resistant. In addition, the secure memory is preferably writable, so that the keys may be reprogrammed as desired, for example, for each billing period. The limited secure memory capacity of conventional set-top terminals limits the number of keys that may be stored and thereby limits the number of packages which may be offered by a service provider. It is noted that the number of programs typically broadcast by a service provider during a monthly billing period can be on the order of 200,000.

In one variation, conventional set-top terminals contain a bit vector having a bit entry corresponding to each package of programs offered by the service provider. Typically, each package corresponds to one television channel. If a particular customer is entitled to a package, the corresponding bit entry in the bit vector stored in the set-top terminal is set to one ("1"). Thereafter, all programs transmitted by the service provider are encrypted with a single key. Upon receipt of a given program, the set-top terminal accesses the bit vector to determine if the corresponding bit entry has been set. If the bit entry has been set, the set-top terminal utilizes a single stored decryption key to decrypt the program.

While, in theory, flexibility is achieved in the bit vector scheme by providing a bit entry for each program, the length of the bit vector would be impractical in a system transmitting many programs in a single billing period. In addition, access control in such a system is provided exclusively by the entries in the bit vector and is not cryptographic. Thus, if a customer is able to overwrite the bit vector, and set all bits to one ("1"), then the customer obtains access to all programs.

In a further variation, programs are divided into packages, and all programs in a given package are encrypted using the same key. Again, each package typically corresponds to one television channel. The set-top terminal stores a decryption key for each package the customer is entitled to. Thus, if a program is to be included in a plurality of packages, then the program must be retransmitted for each associated package, with each transmission encrypted with the encryption key corresponding to the particular package. Although the access control is cryptographic, the overhead associated with retransmitting a given program a number of times discourages service providers from placing the same program in a number of packages and thereby limits flexibility in designing packages of programs.

While such previous systems for encrypting and transmitting programming content have been relatively successful in restricting access to authorized customers, they do not permit a service provider, such as a television network, to offer many different packages containing various numbers of programs to customers, without exceeding the limited secure memory capacity of the set-top terminal. As apparent from the above-described deficiencies with conventional systems for transmitting encrypted programming content, a need exists for a system for transmitting a program encrypted with a unique key, together with the unique key used to encrypt the program. A further need exists for a system that permits a service provider to include a program in a plurality of packages, without requiring the service provider to retransmit the program for each package. Yet another need exists for an access control system that overcomes the secure memory limitations of the set-top terminal without significantly increasing the overhead associated with the transmitted programming content.

SUMMARY OF THE INVENTION

Generally, encrypted programming content is transmitted by a service provider using a transmitter, or head-end server, to one or more customers. According to one aspect of the invention, the encryption key used to encrypt the program is transmitted to the customer with the programming content. Each customer preferably has a set-top terminal or another mechanism to restrict access to the transmitted multimedia information using decryption keys. According to a further aspect of the invention, the set-top terminal preferably receives one or more package keys, $S_j$, periodically from the head-end, each corresponding to a package of programs that the customer is entitled to for a given period.

Each program is preferably encrypted by the head-end server prior to transmission, using a program key, $K_P$, which may be unique to the program. In addition to transmitting the encrypted program, the head-end server preferably transmits header information to the customers, containing a package pair for each package to which the program belongs. A package pair preferably includes an identifier of the package, as well as the program key, $K_P$, encrypted by the corresponding package key, $S_J$. Thus, in one embodiment, the broadcast of a given program, p, consists of a header portion containing a package pair for each package that the program belongs to, and a program portion containing the program encrypted with the program key, $K_P$. In this manner, if a customer is entitled to a particular program, the set-top terminal will be able to decrypt the encrypted program key, $K_P$, using the appropriate stored package key, $S_J$, and thereafter use the program key, $K_P$, to decrypt the encrypted program. In various embodiments, the header information can be interleaved with the program portion or transmitted on a separate dedicated control channel.

A more complete understanding of the present invention, as well as further features and advantages of the present invention, will be obtained by reference to the following detailed description and drawings.

DETAILED DESCRIPTION

Figure 1:
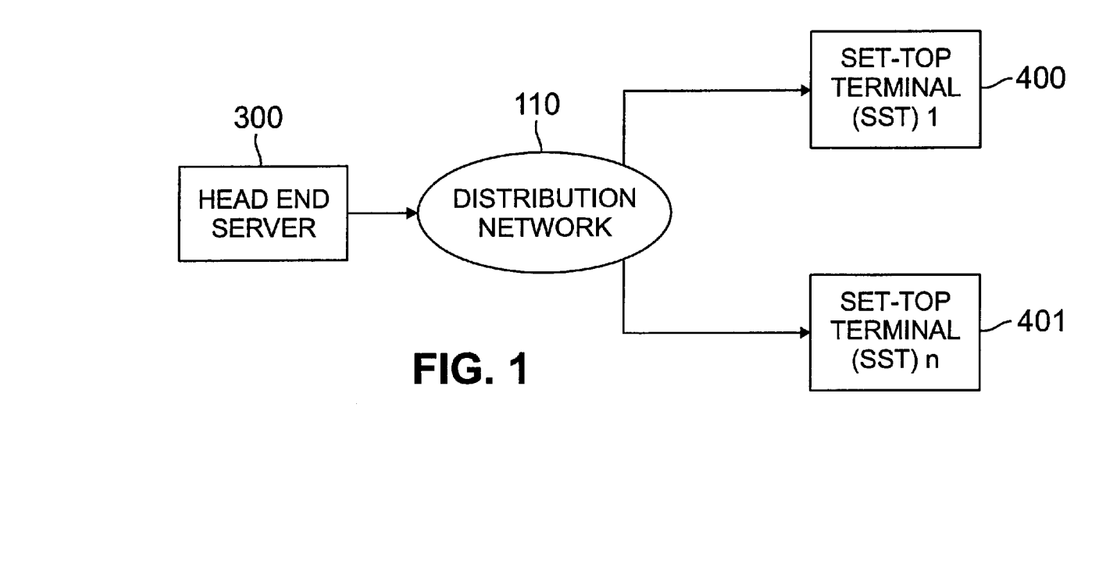
FIG. 1 is a schematic block diagram illustrating a system for transmitting encrypted programming content in accordance with one embodiment of the present invention.

FIG. 1 shows an illustrative network environment for transferring encrypted multimedia information, such as video, audio and data, from a service provider using a transmitter, such as a head-end server 300, to one or more customers having set-top terminals 400–401, such as the set-top terminal 400, over one or more distribution networks 110. As used herein, a set-top terminal includes any mechanism to restrict access to the transmitted multimedia information using decryption keys, including, for example, a computer configuration, as well as telecommunications equipment. It is possible for software executed by the set-top terminal to be downloaded by the service provider. The distribution network 110 can be a wireless broadcast network for distribution of programming content, such as a digital satellite service ("DSS™"), or a conventional wired network, such as the cable television network ("CATV"), the Public Switched Telephone Network ("PSTN"), an optical network, a broadband integrated services digital network ("ISDN") or the Internet.

According to a feature of the present invention, the set-top terminal 400, discussed further below in conjunction with FIG. 4, intermittently receives one or more package keys, $S_J$, from the head-end server 300, discussed further below in conjunction with FIG. 3, each corresponding to a package that the customer is entitled to for a given time interval, such as a billing period. As used herein, a package is a predefined set of programs, and a given program can belong to one or more packages. A program is any continuous multimedia transmission of a particular length, such as a television episode or a movie. The package keys, $S_J$, can be downloaded from the head-end server 300 to the set-top terminal 400 using any suitably secure uni-directional or bi-directional protocol, as would be apparent to a person of ordinary skill.

As discussed further below, each transmitted program is encrypted by the headend server 300 using a program key, $K_P$, which may be unique to the program. For a detailed discussion of suitable encryption and security techniques, see B. Schneier, Applied Cryptography (2d ed. 1997), incorporated by reference herein. In addition to transmitting the encrypted program, the head-end server 300 also transmits header information to the set-top terminals 400, containing a package pair for each package to which the program belongs. A package pair includes an identifier of the package, as well as the program key, $K_P$, encrypted by the corresponding package key, $S_J$.

Figure 2:
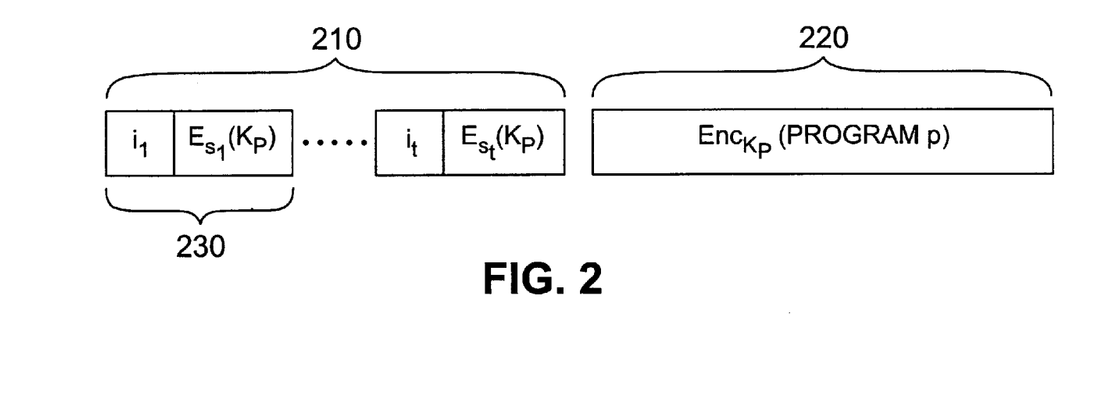
FIG. 2 is an example of the data format of an encrypted program together with a package pair for each package the program belongs to, containing the encryption key used to encrypt the program.

Thus, as shown in FIG. 2, the broadcast of a given program, p, consists of a header portion 210 containing a package pair 230 for each package that the program belongs to, and a program portion 220 containing the program encrypted with the program key, $K_P$. In this manner, if a customer is entitled to a particular program, the set-top terminal 400 will be able to decrypt the encrypted program key, $K_P$, using the appropriate stored package key, $S_J$, and thereafter use the program key, $K_P$, to decrypt the encrypted program.

Figure 3:
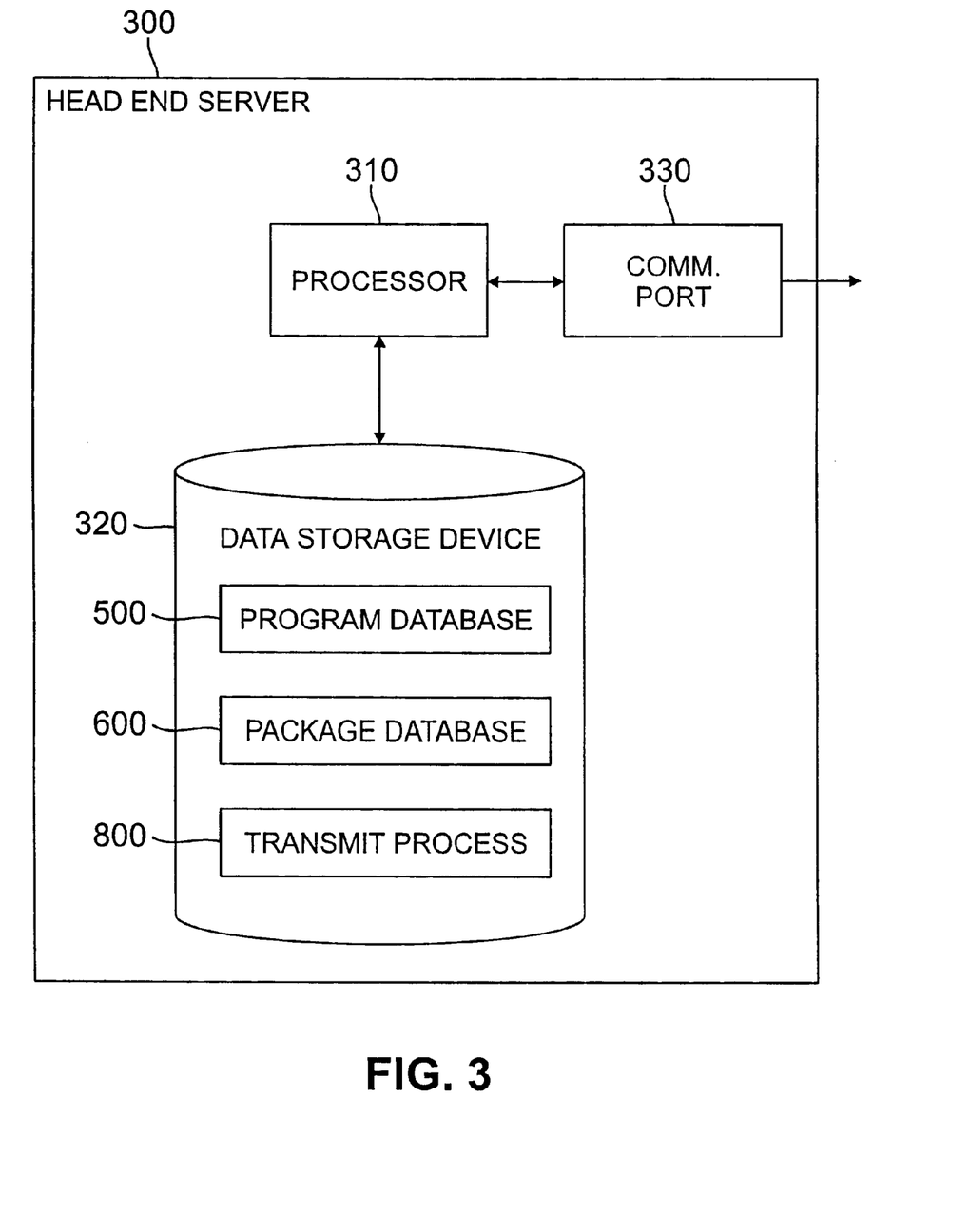
FIG. 3 is a schematic block diagram of an exemplary head-end server of FIG. 1.

FIG. 3 is a block diagram showing the architecture of an illustrative head-end server 300. The head end may be associated with a television network, a cable operator, a digital satellite service operator, or any service provider transmitting encrypted programming content. The head-end server 300 may be embodied, for example, as an RS 6000 server, manufactured by IBM Corp., as modified herein to execute the functions and operations of the present invention. The head-end server 300 preferably includes a processor 310 and related memory, such as a data storage device 320. The processor 310 may be embodied as a single processor, or a number of processors operating in parallel. The data storage device 320 and/or a read only memory (ROM) are operable to store one or more instructions, which the processor 310 is operable to retrieve, interpret and execute. The processor 310 preferably includes a control unit, an arithmetic logic unit (ALU), and a local memory storage device, such as, for example, an instruction cache or a plurality of registers, in a known manner. The control unit is operable to retrieve instructions from the data storage device 320 or ROM. The ALU is operable to perform a plurality of operations needed to carry out instructions. The local memory storage device is operable to provide high-speed storage used for storing temporary results and control information.

As discussed further below in conjunction with FIGS. 5 and 6, the data storage device 320 preferably includes a program database 500 and a package database 600. The program database 500 preferably stores information on each program, p, which will be transmitted by the head-end server 300, for example, during a given billing period, including the packages the program belongs to and the corresponding program key, $K_P$. The package database 600 preferably stores information on each package offered by the head-end server 300 to customers, including the name of each package and the corresponding package key, $S_J$.

In addition, as discussed further below in conjunction with FIG. 8, the data storage device 320 preferably includes a transmit process 800. Generally, the transmit process 800 identifies the program key, $K_P$, of a given program and the packages that the program belongs to, in order to generate the package pairs to be transmitted along with the encrypted program. The communications port 330 connects the head-end server 300 to the distribution network 110, thereby linking the head-end server 300 to each connected receiver, such as the set-top terminal 400 shown in FIG. 1.

Figure 4:
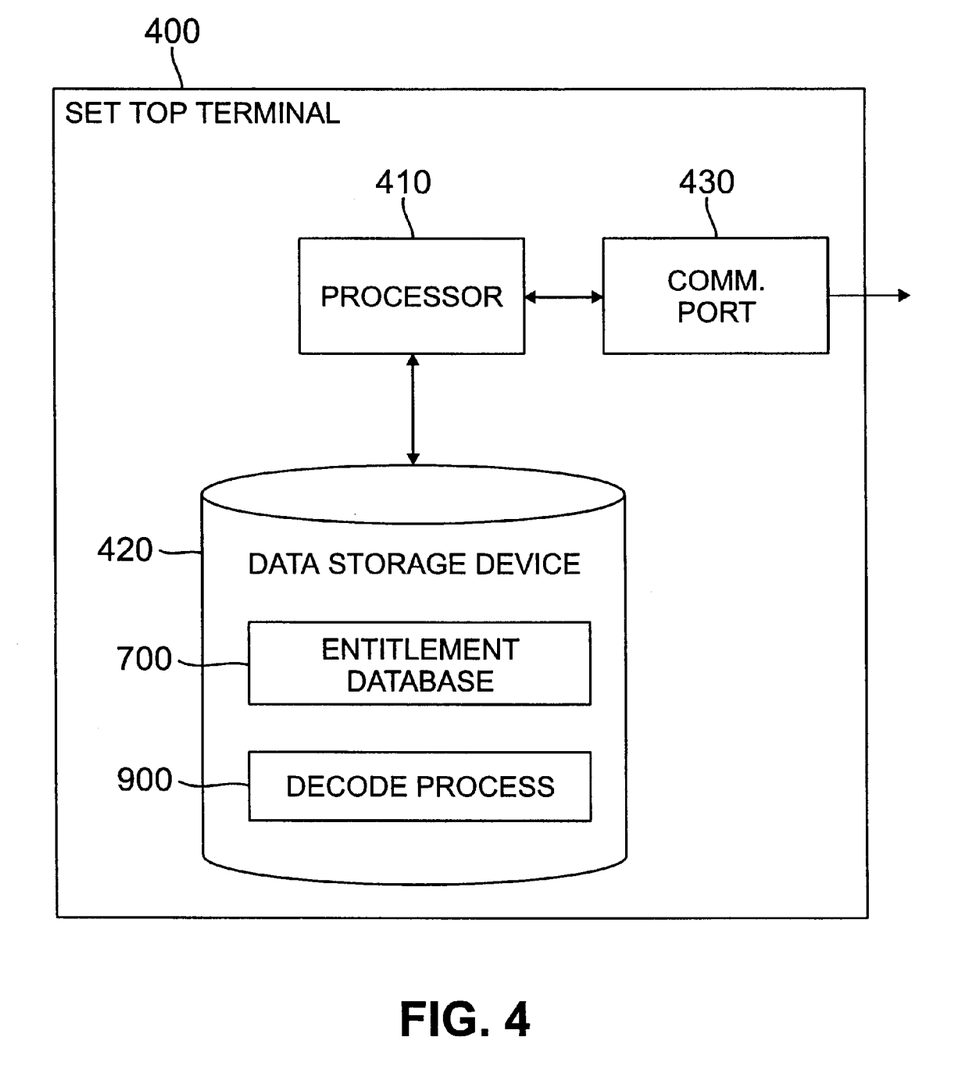
FIG. 4 is a schematic block diagram of an exemplary receiver of FIG. 1.

FIG. 4 is a block diagram showing the architecture of an illustrative set-top terminal 400. The set-top terminal 400 may be embodied, for example, as a set-top terminal (STT) associated with a television, such as those commercially available from General Instruments Corp., as modified herein to execute the functions and operations of the present invention. The set-top terminal 400 preferably includes a processor 410 and related memory, such as a data storage device 420, as well as a communication port 430, which operate in a similar manner to the hardware described above in conjunction with FIG. 3.

As discussed further below in conjunction with FIG. 7, the data storage device 420 preferably includes an entitlement database 700. The entitlement database 700 is preferably stored in a secure portion of the data storage device 420. The entitlement database 700 preferably stores a package identifier and the corresponding package key, $S_J$, for each package that the customer is entitled to. In addition, as discussed further below in conjunction with FIGS. 9a and 9b, the data storage device 420 preferably includes a decode process 900. Generally, the decode process 900 decrypts programs that a customer is entitled to, by using the corresponding stored package key, $S_J$, to decrypt the transmitted program key, $K_P$, and then using the program key, $K_P$, to decrypt the program.

Figure 5:
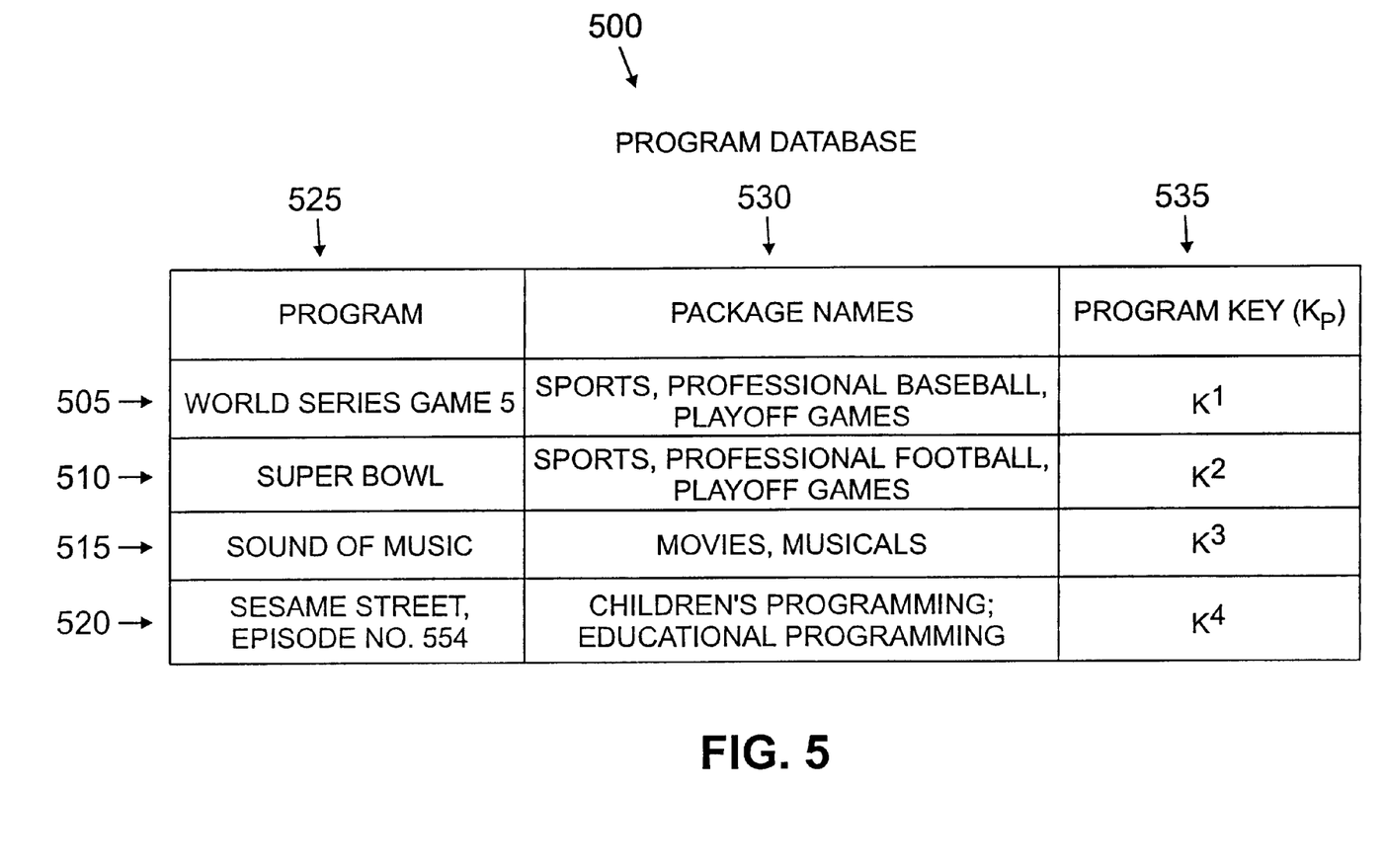
FIG. 5 illustrates a sample table from the program database of FIG. 4.

FIG. 5 illustrates an exemplary program database 500 that preferably stores information on each program, p, which will be transmitted by the head-end server 300, for example, during a given billing period, including the packages the program belongs to and the corresponding program key, $K_P$. The program database 500 maintains a plurality of records, such as records 505–520, each associated with a different program. For each program identified by program name in field 525, the program database 500 includes an indication of the corresponding packages to which the program belongs in field 530 and the corresponding program key, $K_P$, in field 535.

Figure 6:
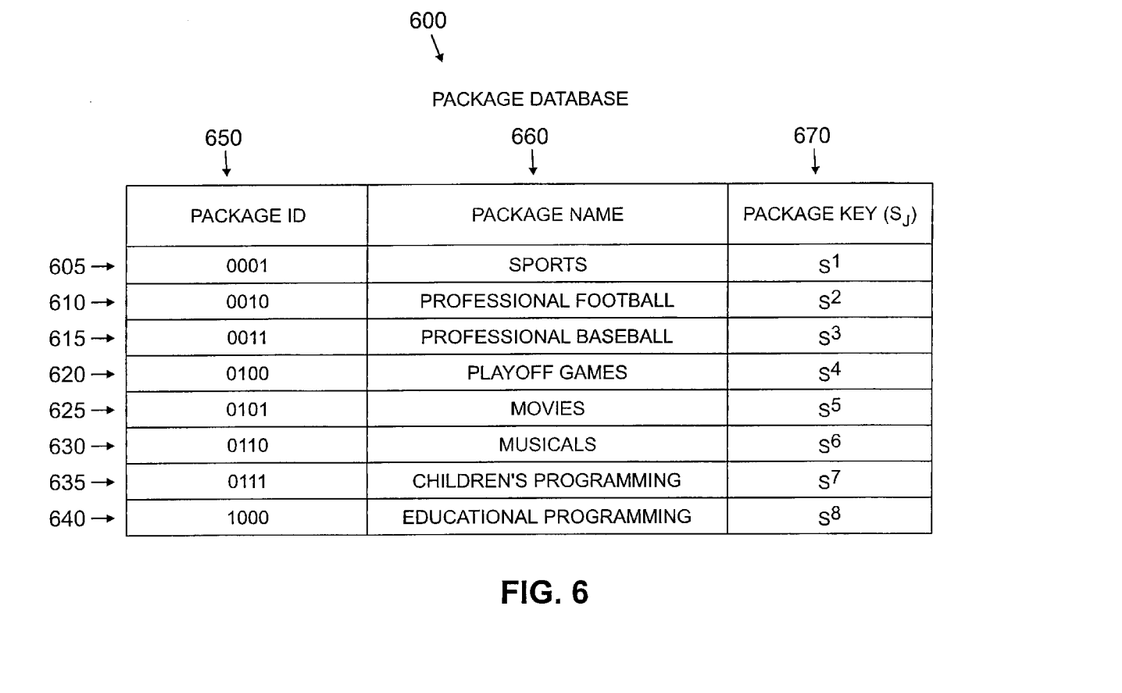
FIG. 6 illustrates a sample table from the package database of FIG. 4.

FIG. 6 illustrates an exemplary package database 600 that preferably stores information on each package offered by the head-end server 300 to customers, including the name of each package and the corresponding package key, $S_J$. The package database 600 maintains a plurality of records, such as records 605–640, each associated with a different package. For each package identified by a package identifier in field 650, the package database 600 includes an indication of the corresponding package name in field 660 and the corresponding package key, $S_J$, in field 670.

Figure 7:
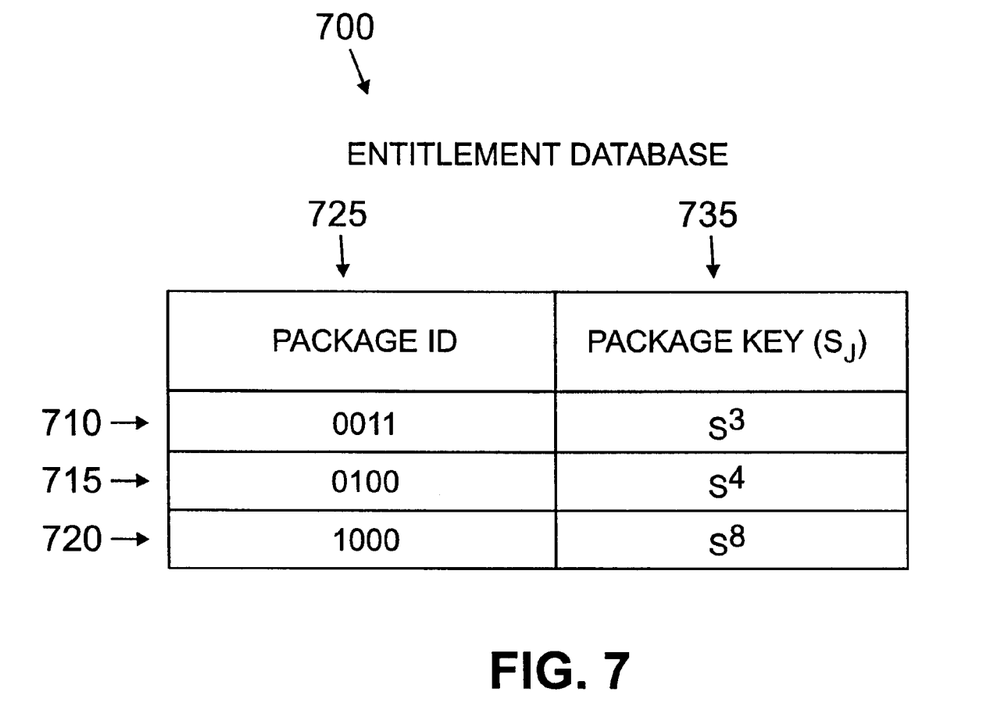
FIG. 7 illustrates a sample table from the entitlement database of FIG. 5.

FIG. 7 illustrates an exemplary entitlement database 700 that preferably stores a package identifier and the corresponding package key, $S_J$, for each package that the customer is entitled to. The entitlement database 700 maintains a plurality of records, such as records 710–720, each associated with a different entitled package. For each package identified by a package identifier in field 725, the entitlement database 700 includes an indication of the corresponding package key, $S_J$, in field 735.

Figure 8:
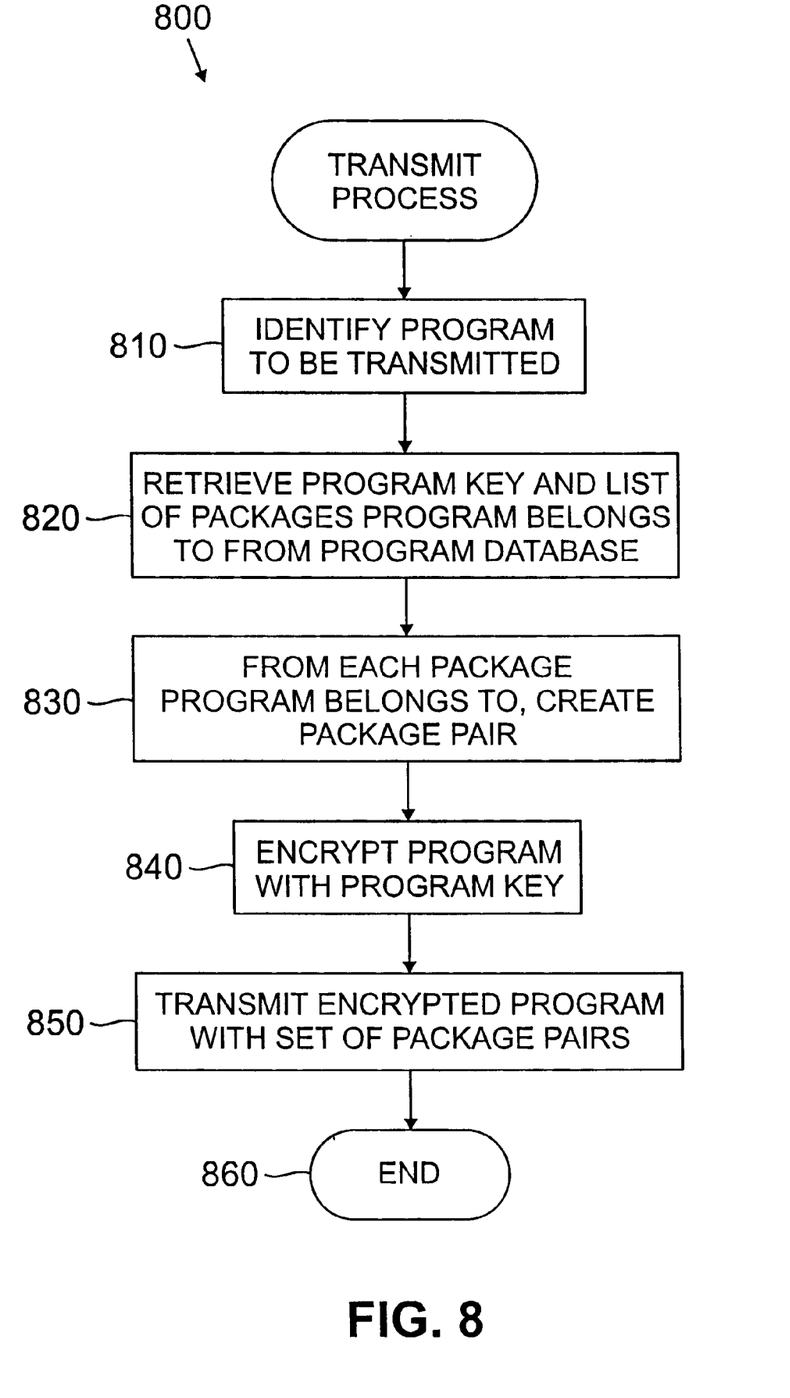
FIG. 8 is a flow chart describing an exemplary transmit process as implemented by the head-end server of FIG. 3.

As discussed above, the head-end server 300 preferably executes a transmit process 800, shown in FIG. 8, to identify the program key, $K_P$, of a given program and the packages that the program belongs to, in order to generate the package pairs to be transmitted along with the encrypted program. It is noted that the transmit process 800, other than the actual transmission step, can be executed offline or in real-time. As illustrated in FIG. 8, the transmit process 800 begins the processes embodying the principles of the present invention during step 810 by identifying a program to be transmitted.

Thereafter, during step 820, the transmit process 800 retrieves the program key, $K_P$, corresponding to the program and the list of packages to which the program belongs from the program database 500. For each package the program belongs to, the transmit process 800 will then retrieve the package identifier and the corresponding package key, $S_J$, from the package database 600, to generate a package pair to be included in the transmitted header information.

The program will then be encrypted during step 840 with the program key, $K_P$, retrieved during step 820. Finally, the transmit process 800 will transmit the encrypted program together with the set of package pairs during step 850, before program control terminates during step 860. It is noted that the header information containing the package pairs are preferably transmitted periodically interleaved throughout the transmission of the program information, so that a customer can change channels during a program and be able to obtain the transmitted keys which are required to decrypt the program. The overhead incurred by periodically transmitting the header information should be balanced against the delay a customer will incur after changing a channel until the required decryption keys are obtained. In an alternate embodiment, the header information containing the package pairs can be continuously transmitted on a separate control channel, such as a Barker channel.

Figure 9A:
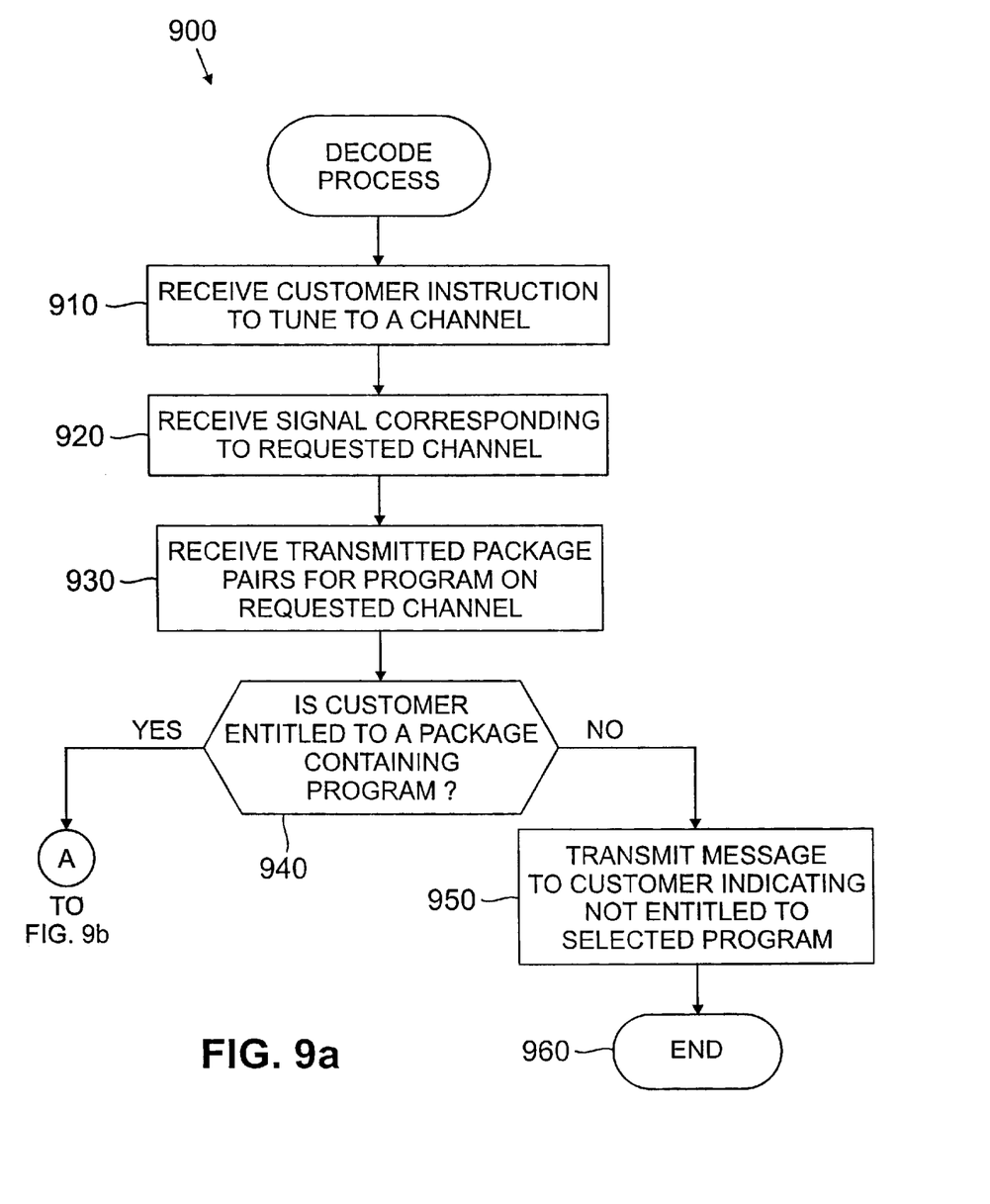
FIGS. 9a and 9b, collectively, are a flowchart describing an exemplary decode process as implemented by the receiver of FIG. 4.
Figure 9B:
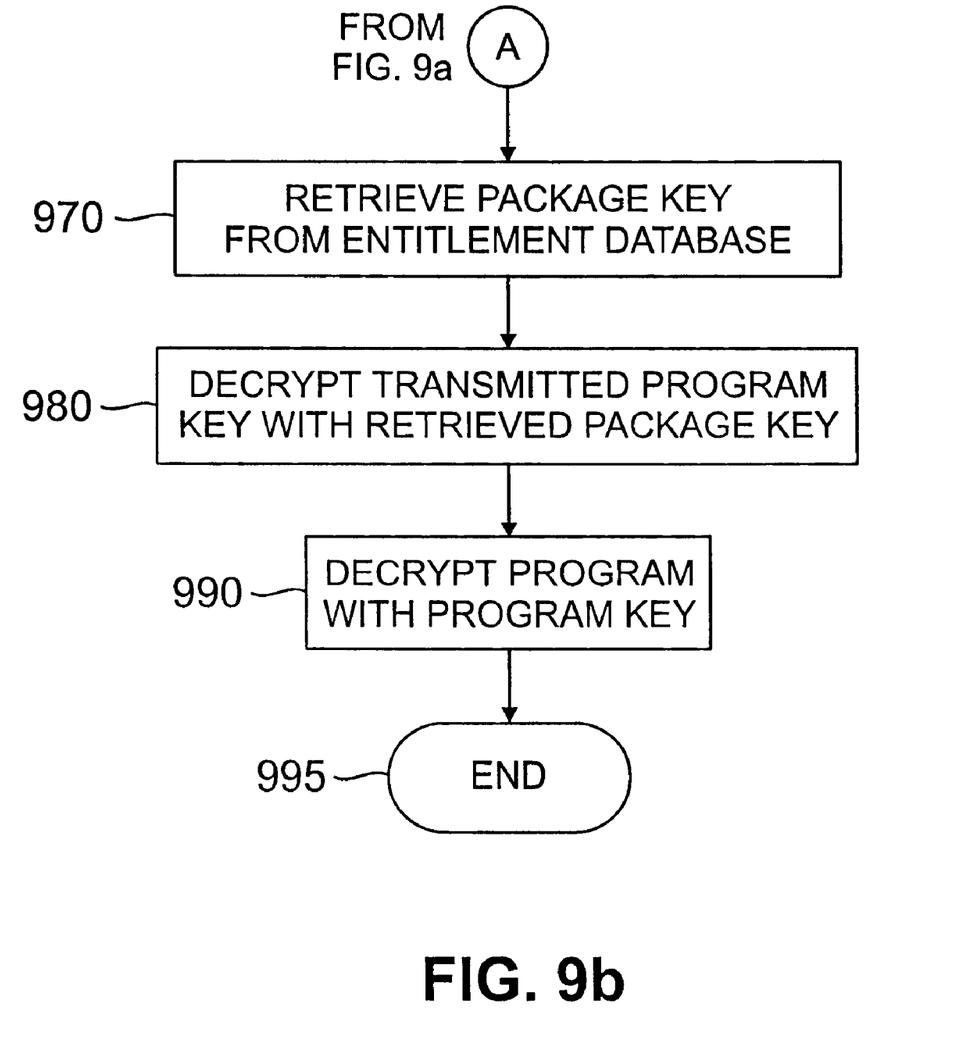

As discussed above, the set-top terminal 400 preferably executes a decode process 900, shown in FIGS. 9a and 9b, to decrypt programs that a customer is entitled to, by using the corresponding stored package key, $S_J$, to decrypt the transmitted program key, $K_P$, and then using the program key, $K_P$, to decrypt the program. As illustrated in FIG. 9a, the decode process 900 begins the processes embodying the principles of the present invention during step 910, upon receipt of a customer instruction to tune to a particular channel.

Thereafter, the set-top terminal 400 will tune to the requested channel during step 920 to receive the appropriate signal. The decode process 900 then retrieves the transmitted package pairs during step 930 for the program transmitted on the requested channel. A test is then performed during step 940 to determine if the customer is entitled to a package containing the requested program. For example, the decode process 900 will determine if a package identifier from one of the package pairs retrieved during step 930 matches a package identifier stored in the entitlement database 700.

If it is determined during step 940 that the customer is not entitled to entitled to a package containing the requested program, then a message is preferably transmitted to the customer during step 950 indicating that the customer is not entitled to view the selected program, before program control terminates during step 960. If, however, it is determined during step 940 that the customer is entitled to a package containing the requested program, then program control proceeds to step 970 (FIG. 9*b*).

If the customer is entitled to view the requested program, then the decode process 900 retrieves the package key, $S_J$, corresponding to the entitled package from the entitlement database 700 during step 970 and then uses the retrieved package key, $S_J$, during step 980 to decrypt the transmitted program key included in the transmitted header information, or on a separate control channel. Finally, the program itself is decrypted during step 990 using the program key, $K_P$, during step 990, before program control terminates during step 995.

It is noted that the decode process 900 can wait for the customer to request a particular channel before attempting to obtain the transmitted decryption keys and determine whether the customer is entitled to the requested channel, as described above, or the decode process 900 can alternatively periodically scan all channels to obtain the transmitted package pairs for storage in the data storage device 420 and predetermine the customer's entitlement.

It is to be understood that the embodiments and variations shown and described herein are merely illustrative of the principles of this invention and that various modifications may be implemented by those skilled in the art without departing from the scope and spirit of the invention.

I claim:

1. A method of transmitting a plurality of programs having restricted access to an end-user, said method comprising the steps of:
    defining a plurality of packages, each package comprising at least one of said programs;
    providing a package key to said end-user for each package obtained by said end-user;
    encrypting a program to be transmitted to said end-user using a program key; and
    transmitting said encrypted program together with package information for each package said program belongs to, said package information including said program key encrypted with said package key.

2. The method according to claim 1, wherein said package information further comprises an identifier of said associated package.

3. The method according to claim 1, wherein said package information is interleaved with the transmission of said encrypted program.

4. The method according to claim 1, wherein said package information is transmitted on a control channel.

5. A method of transmitting a program associated with at least one package of programs to a plurality of customers, said method comprising the steps of:
    providing a package key to each of said customers for each package obtained by said customer;
    identifying said packages associated with said program;
    encrypting said program to be transmitted to said customers using a program key; and
    transmitting said encrypted program together with package information for each identified package, said package information including said program key encrypted with said package key.

6. The method according to claim 5, wherein said package information further comprises an identifier of said associated package.

7. The method according to claim 5, wherein said package information is interleaved with the transmission of said encrypted program.

8. The method according to claim 5, wherein said package information is transmitted on a control channel.

9. A method of transmitting a program associated with at least one package of programs to a plurality of customers, said method comprising the steps of:
    providing a package key to each of said customers for each package obtained by each of said customers;
    encrypting said program using a program key; and
    transmitting said program key with said encrypted program to said customers, said transmitted program key encrypted with said package key corresponding to a package containing said program.

10. The method according to claim 9, wherein said program key is transmitted encrypted with a package key for each package said program is associated with.

11. The method according to claim 9, further comprising the step of transmitting one or more package keys to each customer, each package key corresponding to a package of programs said customer is entitled to.

12. The method according to claim 9, wherein said program key is interleaved with the transmission of said encrypted program.

13. The method according to claim 9, wherein said program key is transmitted on a control channel.

14. A method for decoding an encrypted program associated with a package of programs, said method comprising the steps of:
    receiving said encrypted program together with package information, said package information including a program key encrypted with a package key, said program key being used by a provider of said program to encrypt said program;
    retrieving a package key corresponding to said package;
    decrypting said package information using said retrieved package key to obtain said program key; and
    decrypting said encrypted program using said program key.

15. The method according to claim 14, further comprising the step of receiving one or more package keys from said provider, each package key corresponding to a package of programs a customer is entitled to.

16. The method according to claim 14, wherein said package information further comprises an identifier of said associated package.

17. The method according to claim 14, wherein said package information is interleaved with the transmission of said encrypted program.

18. The method according to claim 14, wherein said package information is transmitted on a control channel.

19. The method according to claim 14, wherein said package information is evaluated upon a request to view said program.

20. The method according to claim 14, wherein said package information is evaluated in advance of a request to view said program.

21. A method of receiving an encrypted program having restricted access, said method comprising the steps of:
    storing a package key corresponding to each package of said programs which said customer is entitled to;
    receiving said encrypted program together with package information, said package information including a program key encrypted with said package key, said program key being used by a provider of said program to encrypt said program;
    decrypting said package information using said retrieved package key to obtain program key; and decrypting said encrypted program using said program key.

22. The method according to claim 21, wherein said package information further comprises an identifier of said associated package.

23. The method according to claim 21, wherein said package information is interleaved with the transmission of said encrypted program.

24. The method according to claim 21, wherein said package information is transmitted on a control channel.

25. The method according to claim 21, wherein said package information is evaluated when said customer requests to view said program.

26. The method according to claim 21, wherein said package information is evaluated in advance of said customer requesting to view said program.

27. An article of manufacture comprising:

a computer readable medium having computer readable code means embodied thereon, said computer readable program code means comprising:

a step to identify one or more packages associated with a program to be transmitted, each of said packages having an associated package key;

a step to encrypt said program to be transmitted to a plurality of customers using a program key; and a step to transmit said encrypted program together with package information for each identified package, said package information including said program key encrypted with said package key.

28. An article of manufacture comprising:

a computer readable medium having computer readable code means embodied thereon, said computer readable program code means comprising:

a step to receive an encrypted program together with package information, said package information including a program key encrypted with a package key, said program key being used to encrypt said program;

a step to retrieve said package key corresponding to a package to which said encrypted program belongs;

a step to decrypt said package information using said retrieved package key to obtain said program key; and a step to decrypt said encrypted program using said program key.

* * * * *

UNITED STATES PATENT AND TRADEMARK OFFICE
CERTIFICATE OF CORRECTION

PATENT NO.   : 6,073,122
DATED        : June 6, 2000
INVENTOR(S)  : Avishai Wool It is certified that error appears in the above-identified patent and that said Letters Patent is hereby corrected as shown below:

Column 7,
Line 27 through line 40, replace claim 1 with the following claim:

1.  A method of transmitting a plurality of programs having restricted access to an end-user, said method comprising the steps of:
    defining a plurality of packages, each package comprising at least one of said programs;
    providing a package key to said end-user for each package obtained by said end-user;
    encrypting a program to be transmitted to said end-user using a program key; and
    transmitting said encrypted program together with package information for each package said program belongs to, said package information including said program key encrypted with said package key that is unique for said corresponding package containing said program.

Line 49 through line 61, replace claim 5 with the following claim:

5.  A method of transmitting a program associated with at least one package of programs to a plurality of customers, said method comprising the steps of:
    providing a package key to each of said customers for each package obtained by said customer;
    identifying said packages associated with said program;
    encrypting said program to be transmitted to said customers using a program key; and
    transmitting said encrypted program together with package information for each identified package, said package information including said program key encrypted with said package key that is unique for said corresponding package containing said program.

Column 8,
Line 3 through line 12, replace claim 9 with the following claim:

9.  A method of transmitting a program associated with at least one package of programs to a plurality of customers, said method comprising the steps of:
    providing a package key to each of said customers for each package obtained by each of said customers;
    encrypting said program using a program key; and
    transmitting said program key with said encrypted program to said customers, said transmitted program key encrypted with said package key that is unique for said corresponding package containing said program.

UNITED STATES PATENT AND TRADEMARK OFFICE
CERTIFICATE OF CORRECTION

PATENT NO.   : 6,073,122
DATED        : June 6, 2000
INVENTOR(S)  : Avishai Wool It is certified that error appears in the above-identified patent and that said Letters Patent is hereby corrected as shown below:

Column 8 (cont'd),
Line 25 through line 37, replace claim 14 with the following claim:

14.     A method for decoding an encrypted program associated with a package of programs, said method comprising the steps of:
    receiving said encrypted program together with package information, said package information including a program key encrypted with a package key, said program key being used by a provider of said program to encrypt said program;
    retrieving a package key corresponding to said package;
    decrypting said package information using said retrieved package key that is unique for said corresponding package containing said program to obtain said program key; and
    decrypting said encrypted program using said program key.

Column 8, line 57 through Column 9, line 2,
Replace claim 21 with the following claim:

21.     A method of receiving an encrypted program having restricted access, said method comprising the steps of:
    storing a package key corresponding to each package of said programs which said customer is entitled to;
    receiving said encrypted program together with package information, said package information including a program key encrypted with said package key that is unique for said corresponding package containing said program, said program key being used by a provider of said program to encrypt said program;
    decrypting said package information using said retrieved package key to obtain program key; and
    decrypting said encrypted program using said program key.

Column 9, line 17 through Column 10, line 6,
Replace claim 27 with the following claim:

27.     An article of manufacture comprising:
    a computer readable medium having computer readable code means embodied thereon, said computer readable program code means comprising:
    a step to identify one or more packages associated with a program to be transmitted, each of said packages having an associated package key;
    a step to encrypt said program to be transmitted to a plurality of customers using a program key; and
    a step to transmit said encrypted program together with package information for each identified package, said package information including said program key encrypted with said package key that is unique for said corresponding package containing said program.

UNITED STATES PATENT AND TRADEMARK OFFICE
CERTIFICATE OF CORRECTION

PATENT NO.   : 6,073,122
DATED        : June 6, 2000
INVENTOR(S)  : Avishai Wool It is certified that error appears in the above-identified patent and that said Letters Patent is hereby corrected as shown below:

Column 10,
Line 7 through line 21, replace claim 28 with the following claim:

28.    An article of manufacture comprising:
       a computer readable medium having computer readable code means embodied thereon, said computer readable program code means comprising:
       a step to receive an encrypted program together with package information, said package information including a program key encrypted with a package key, said program key being used to encrypt said program;
       a step to retrieve said package key corresponding to a package to which said encrypted program belongs;
       a step to decrypt said package information using said retrieved package key that is unique for said corresponding package containing said program to obtain said program key; and
       a step to decrypt said encrypted program using said program key.

Signed and Sealed this

Nineteenth Day of August, 2003

JAMES E. ROGAN
*Director of the United States Patent and Trademark Office*